(12) United States Patent
Kuo et al.

(10) Patent No.: US 6,769,760 B1
(45) Date of Patent: Aug. 3, 2004

(54) MICROARRAY PRINTING DEVICE

(75) Inventors: Hsien-Nan Kuo, Kaohsiung (TW); Chi-Wah Keong, Kaohsiung (TW); Chun-Chieh Wang, Kaohsiung (TW); Paul C. K. Chung, Kaohsiung (TW)

(73) Assignee: Metal Industries Research and Development Centre (TW)

( * ) Notice: Subject to any disclaimer, the term of this patent is extended or adjusted under 35 U.S.C. 154(b) by 242 days.

(21) Appl. No.: 10/100,887

(22) Filed: Mar. 19, 2002

(51) Int. Cl.[7] .............................................. B41J 2/135
(52) U.S. Cl. ........................................................ 347/44
(58) Field of Search ............................ 347/1, 2, 12, 13, 347/40, 42, 44, 20, 54; 346/139 C, 139; 400/124.14; 422/100

(56) References Cited

U.S. PATENT DOCUMENTS 6,629,626 B1 * 10/2003 Horsman et al. ............ 222/420

* cited by examiner

*Primary Examiner*—Stephen D. Meier
*Assistant Examiner*—An H. Do
(74) *Attorney, Agent, or Firm*—Fulwider Patton Lee & Utecht, LLP

(57) ABSTRACT

A microarray printing device includes an elongate holder with a plurality of receiving slots and a plurality of printing pins. Each of the printing pins extends through and is linearly movable in a respective one of the slots in the holder, and has head, tip, and shank portions. The shank portion has a surface formed with at least one longitudinal flute extending from the head portion to the tip portion.

7 Claims, 4 Drawing Sheets

MICROARRAY PRINTING DEVICE

BACKGROUND OF THE INVENTION

1. Field of the Invention

The invention relates to a microarray printing device, more particularly to a microarray printing device for printing a microarray of biochemical substance in a biochip.

2. Description of the Related Art

Referring to FIG. 1, a conventional microarray printing device 6 is shown to comprise a holder 61 and a plurality of printing pins 62 mounted on the holder 61 and formed with split tips 622. The holder 61 is processed to have an upper surface 611 formed with a plurality of parallel guide grooves 612 and a plurality of receiving slots 616 extending downwardly from the guide grooves 612 to a lower surface 615 of the holder 61. Each of the printing pins 62 has a head portion 621 and a shank portion 623. The head portion 621 has a bottom surface that abuts against a groove bottom of the corresponding groove 612. The shank portion 623 extends slidably through the corresponding slot 616.

In use, the holder 61 is activated to linearly move the pins 62 into proximity with a printing substrate 100 so as to start printing. The pins 62 are immediately removed from the printing substrate 100 after the tips 622 have touched the latter to prevent excessive time of contact which will result in excessive release of liquid (generally, volume of one drop liquid is 2 pL~2 nL) The printing pins 62 are closely arranged in a rectangular pattern so as to achieve the purpose of microarray printing.

However, since the guide grooves 612 are individually processed, their depths are not actually the same. As such, the printing pins 62 are not uniform in height and are not lying on the same planar surface. Thus, some tips 622 of the printing pins 62 are in excessive contact with the printing substrate 100 during the printing process, thereby lowering the printing quality. Furthermore, since the shank portion 623 of each printing pin 62 rubs against the surrounding wall 614 that defines the corresponding slot 616 when the former slides upward and downward along the corresponding slot 616 during the printing process, powdery shavings are produced and are stuck in a gap between the shank portion 623 and the surrounding wall 614, thereby resulting in air blockage, and thereby disabling functionality of the printing pins 62.

Another conventional microarray printing device (not shown) found in the market includes a hollow holder and a plurality of capillary tube-like printing pins hung on a top face within the holder by spring units. Since the cross-sections of the capillary tube-like printing pins are generally small, when the tips of the pins contact the substrate, the tips are subjected to a pressure produced not only by the weight of the shank portions, but also by the biasing forces of the spring units, such that the tips are easily broken.

SUMMARY OF THE INVENTION

Therefore, the main object of the present invention is to provide a microarray printing device that is capable of overcoming the aforementioned drawbacks of the prior art.

According to this invention, a microarray printing device comprises an elongate holder and a plurality of printing pins. The elongate holder has a top face, a bottom face, and a plurality of receiving slots extending through the holder in a direction from the top face to the bottom face. Each of the printing pins extends through and is linearly movable in a respective one of the receiving slots in the holder, and has a head portion, a tip portion opposite to the head portion, and a shank portion between the head and tip portions. The shank portion has a surface formed with at least one longitudinal flute extending from the head portion to the tip portion.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
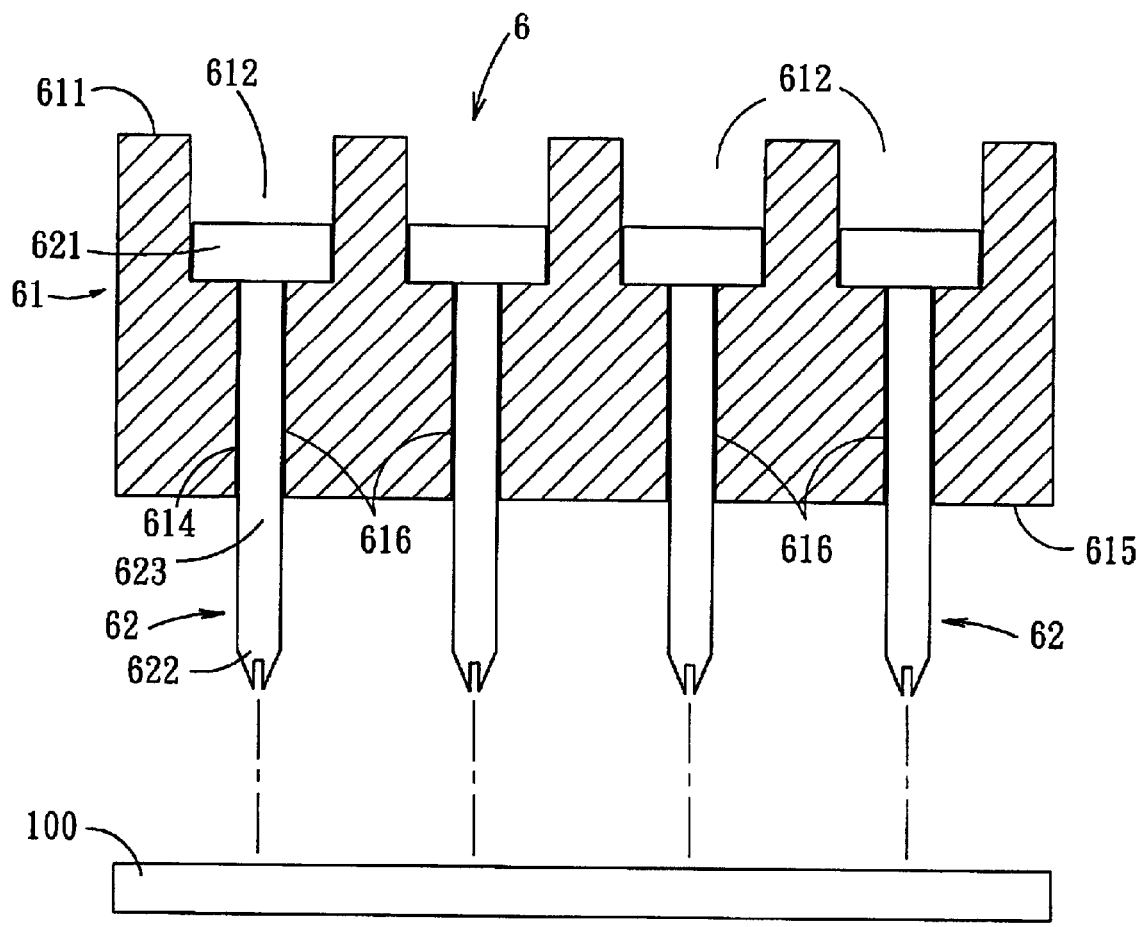
FIG. 1 is a sectional view of a conventional microarray printing device, illustrating its position above a printing substrate.

Before the present invention is described in greater detail, it should be noted that like elements are denoted by the same reference numerals throughout the disclosure.

Figure 2:
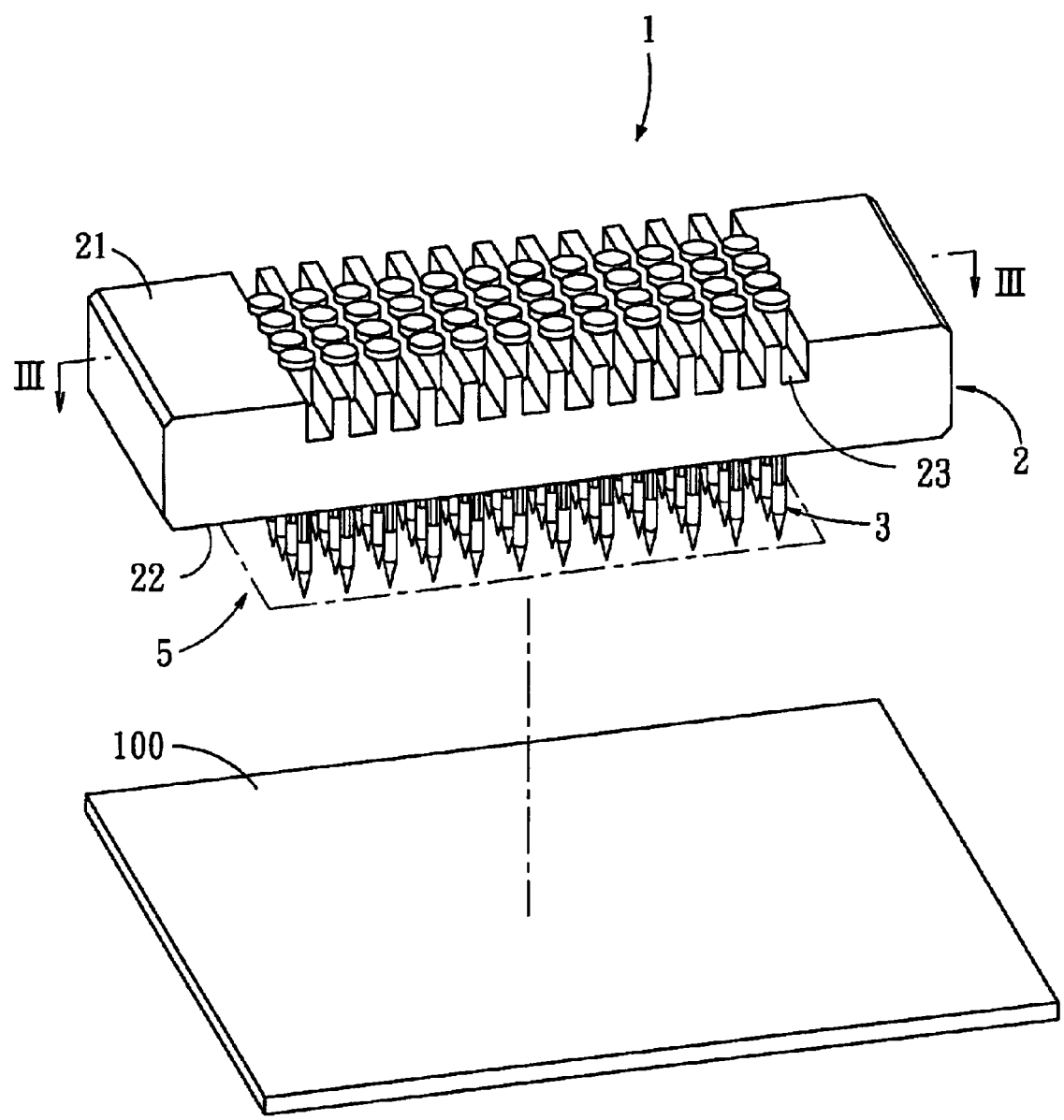
FIG. 2 is a perspective view of the first preferred embodiment of a microarray printing device according to the present invention, illustrating its position above a printing substrate.
Figure 3:
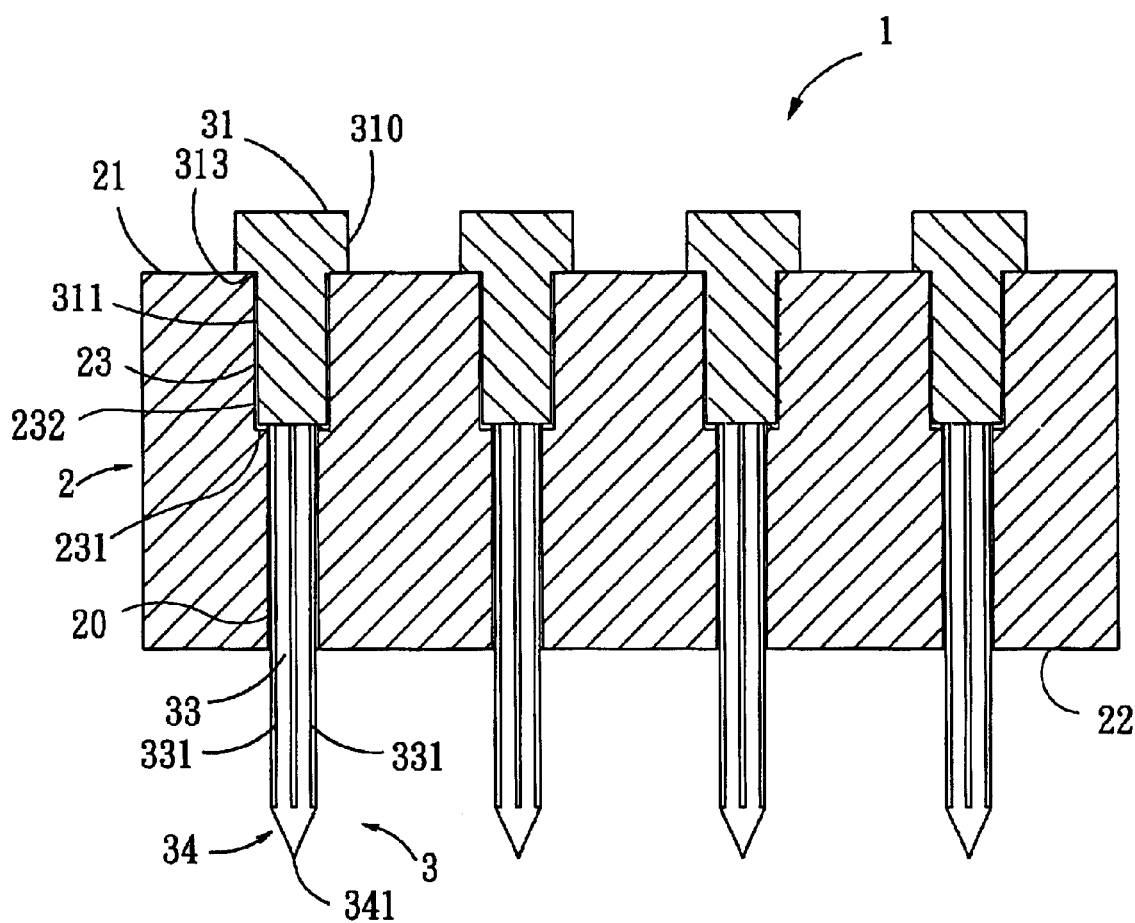
FIG. 3 is a sectional view of the first preferred embodiment, taken along line III—III of FIG. 2.
Figure 4:
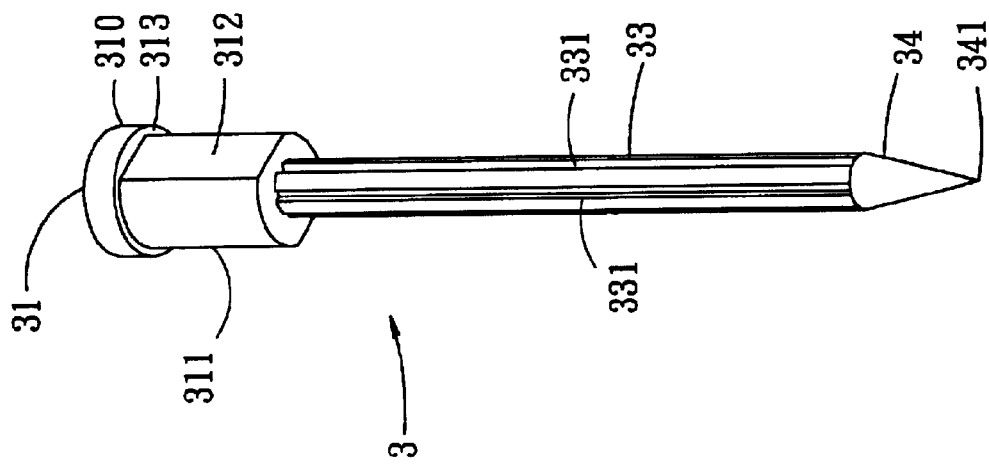
FIG. 4 is a perspective view of a printing pin of the first preferred embodiment.

Referring to FIGS. 2 to 4, the first preferred embodiment of a microarray printing device 1 according to the present invention is shown to comprise an elongate holder 2 and a plurality of printing pins 3. The elongate holder 2 has a top face 21, a bottom face 22, a plurality of receiving slots 20, and a plurality of parallel grooves 23 adjacent to the top face 21. The receiving slots 20 are arranged in rows along the grooves 23. Each of the grooves 23 has a groove bottom 231 and two opposite wall faces 232. The slots 20 in each row extend through the groove bottom 231 of a corresponding one of the grooves 23 and the bottom face 22 of the holder 2.

Each of the printing pins 3 extends through and is linearly movable in a respective one of the receiving slots 20 in the holder 2, and has a head portion 31, a tip portion 34 opposite to the head portion 31, and a shank portion 33 between the head and tip portions 31, 34. The head portion 31 of each printing pin 3 includes an enlarged upper portion 310 disposed above the top face 21 of the holder 2, and a lower portion 311 having a cross-section smaller than that of the upper portion 310.

The upper portion 310 of the head portion 31 of each printing pin 3 has a bottom shoulder face 313 that abuts against the top face 21 of the holder 2 so as to prevent each printing pin 3 from sliding out of the holder 2. By using the top face 21 of the holder 2, which is processed only once, as a reference surface to support the head portions 31 of the printing pins 3 and to control the distance from the bottom shoulder face 313 of the head portion 31 to a tip 341 of the tip portion 34, the tips 341 of all printing pins 3 can be aligned in a plane surface 5 (see FIG. 2). As such, uniform printing can be achieved during the printing process with the use of the printing device 1.

The lower portion 311 of the head portion 31 of each printing pin 3 has two opposite flat sides 312 (see FIG. 4) in sliding contact with the two opposite wall surfaces 232 of a corresponding one of the grooves 23 so as to prevent rotation of each printing pin 3 in each corresponding groove 23, as best shown in FIG. 3.

The shank portion 33 of each printing pin 3 extends slidably into the corresponding one of the slots 20 in the holder 2, and has a surface formed with a plurality of longitudinal flutes 331 which are spaced apart angularly and which extend from the head portion 31 to the tip portion 34 (see FIGS. 3 and 4).

When the printing process proceeds, the printing pins 3 are caused to move linearly within the respective grooves 23 and slots 20 of the holder 2 and to knock a surface of the printing substrate 100 so as to transfer a liquid onto the surface or the substrate 100. Since the flutes 331 in the shank portion 33 of the respective printing pin 3 reduce the weight of the shank portion 33, the printing pins 3 can be prevented from breaking upon moving freely by gravity to knock the substrate 100. In addition, the flutes 331 serve to discharge powdery shavings produced due to friction between the shank portion 33 of each printing pin 3 and a surrounding wall that defines the corresponding one of the slots 20 in the holder 2, and further permit air ventilation.

The shank portion 33 and the tip portion 34 may be made of the same material or of different materials, and may be formed integrally or connected to each other by welding, adhesive bonding, or press fitting to each other. In this embodiment, the printing pins 3 are made of stainless steel. The shank portion 33 and the tip portion 34 are connected securely to each other via press fitting. The surface of each of the printing pins 3 is coated with a material having a low coefficient of friction so as to reduce frictional force with the surrounding walls of the slots 20 in the holder 2. The material may be selected from the group consisting of diamond-like carbon film, molybdenum disulfide, and teflon.

Figure 5:
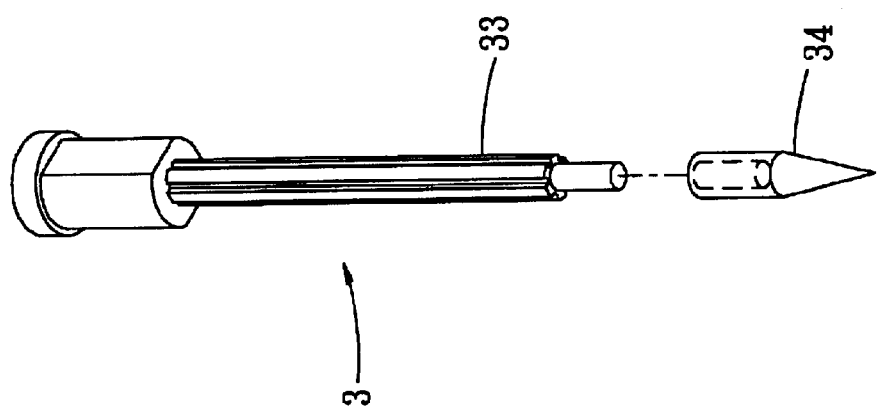
FIG. 5 is a perspective view of a modified printing pin according to the present invention having a detachable tip portion.

Referring to FIG. 5, the second preferred embodiment of a microarray printing device according to the present invention is shown to be substantially similar to the first preferred embodiment. The main difference lies in that the tip portion 34 of each printing pin 3 is connected releasably to the shank portion 33 via a snug fit. Thus, the shank portion 33 or the tip portion 34 can be replaced with one made of a different material as desired.

The advantages of the microarray printing device of the present invention can be summarized as follows:

1. The shank portions 33 of the printing pins 3 are provided with flutes 331 that reduce the weight of the pins 3, that permit air ventilation, and that discharge powdery shavings. As such, the printing process can proceed smoothly. At the same time, the shank portion 33 and the tip portion 34 of each pin 3 can be made of lighter and different materials, thereby reducing the weight of each pin 3 and lowering pressure exerted on the tip 341 of each pin 3, and thereby prolonging the service life of each printing pin 3.

2. The head portion 31 of each pin 3 is formed with an enlarged upper portion 310 that prevents each pin 3 from falling off the holder 2, and a lower portion 311 having two opposite flat sides 312 that prevent rotation of each pin 3 in the holder 2, thereby controlling length of the bottom shoulder face 313 of the head portion 31 and the tip 341 of the tip portion 34 so as to form a planar surface, and thereby achieving uniform printing during the printing process.

3. The surface of each printing pin 3 is coated with a material having a low coefficient of friction, thereby reducing frictional force between the shank portion 33 of each pin 3 and the surrounding wall of the corresponding slot 20 in the holder 2, and thereby permitting the printing process to proceed smoothly.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications arrangements.

We claim:

1. A microarray printing device comprising:

an elongated holder having a top face, a bottom face, and a plurality of receiving slots extending through said holder in a direction from said top face to said bottom face; and a plurality of printing pins, each of which extends through and is linearly movable in a respective one of said receiving slots in said holder, each of said printing pins having a head portion, a tip portion opposite to said head portion, and a shank portion between said head and tip portions, said shank portion having a surface formed with at least one longitudinal flute extending from said head portion to said tip portion, said shank portion having a plurality of said flutes which are spaced apart angularly.

2. The microarray printing device as claimed in claim 1, wherein said head portion of each of said printing pins includes an enlarged upper portion disposed above said top face, and a lower portion having a cross-section smaller than that of said upper portion, said upper portion having a bottom shoulder face that abuts against said top face of said holder;

said holder further including a plurality of parallel grooves adjacent to said top face, each of said grooves having a groove bottom and two opposite wall faces, said slots being arranged in rows along said grooves, said slots in each of said rows extending through said groove bottom of a corresponding one of said grooves and said bottom face of said holder, said lower portion of each of said head portion having two opposite flat sides slidably contacting said two opposite wall surfaces of the corresponding one of said grooves.

3. The microarray printing device as claimed in claim 1 wherein said surface of each of said printing pins is coated with a material having a low coefficient of friction, said material being selected from the group consisting of diamond-like carbon film, molybdenum disulfide, and teflon.

4. The microarray printing device as claimed in claim 1, wherein said shank portion and said tip portion of each of said printing pins are made from different materials.

5. The microarray printing device as claimed in claim 1, wherein said shank portion and said tip portion of said printing pins are adhesively bonded to each other.

6. The microarray printing device as claimed in claim 1, wherein said shank portion and said tip portion of said printing pins are press fitted to each other.

7. The microarray printing device as claimed in claim 1, wherein said shank portion and said tip portion of said printing pins are welded to each other.

* * * * *